(12) United States Patent
Papasakellariou et al.

(10) Patent No.: US 9,166,744 B2
(45) Date of Patent: *Oct. 20, 2015

(54) APPARATUS AND METHOD FOR TRANSMITTING CHANNEL QUALITY INDICATOR AND ACKNOWLEDGEMENT SIGNALS IN SC-FDMA COMMUNICATION SYSTEMS

(71) Applicant: Samsung Electronics Co., Ltd., Gyeonggi-do (KR)

(72) Inventors: Aris Papasakellariou, Dallas, TX (US); Joon-Young Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/508,275

(22) Filed: Oct. 7, 2014

(65) Prior Publication Data

US 2015/0055643 A1 Feb. 26, 2015

Related U.S. Application Data

(63) Continuation of application No. 13/760,771, filed on Feb. 6, 2013, now Pat. No. 8,855,096, which is a continuation of application No. 12/174,098, filed on Jul. 16, 2008, now Pat. No. 8,391,268.

(Continued)

(51) Int. Cl.
*H04L 1/16* (2006.01)
*H04W 72/08* (2009.01)
(Continued)

(52) U.S. Cl.
CPC .............. *H04L 1/1671* (2013.01); *H04J 11/00* (2013.01); *H04L 1/0026* (2013.01); *H04L 1/0028* (2013.01); *H04W 72/08* (2013.01)

(58) Field of Classification Search
None
See application file for complete search history.

(56) References Cited

U.S. PATENT DOCUMENTS 5,533,075 A 7/1996 Jones et al.
6,130,886 A 10/2000 Ketseoglou et al.
(Continued)

FOREIGN PATENT DOCUMENTS

CA 2685006 11/2008
EP 1353467 10/2003
(Continued)

OTHER PUBLICATIONS

3GPP TR 25.814 V7.1.0: 3rd Generation Partnership Project: Technical Specification Group Radio Access Network: Physical Layer Aspects for Evolved Universal Terrestrial Radio A.
(Continued)

*Primary Examiner* — Hassan Phillips
*Assistant Examiner* — Gautam Sharma
(74) *Attorney, Agent, or Firm* — The Farrell Law Firm, P.C.

(57) ABSTRACT

A method and apparatus for transmitting and receiving information symbols in a communication system are provided. A method includes determining a channel quality indicator (CQI); determining two acknowledgement bits in response to data reception; generating a first symbol based on the CQI; generating a second symbol based on the two acknowledgement bits; and transmitting the first symbol and the second symbol. A first code is applied to the second symbol, if the two acknowledgement bits have a first value, a second code is applied to the second symbol, if the two acknowledgement bits have a second value, a third code is applied to the second symbol, if the two acknowledgement bits have a third value, and a fourth code is applied to the second symbol, if the two acknowledgement bits have a fourth value.

16 Claims, 10 Drawing Sheets

Related U.S. Application Data

(60) Provisional application No. 60/950,002, filed on Jul. 16, 2007, provisional application No. 60/954,171, filed on Aug. 6, 2007, provisional application No. 61/019,624, filed on Jan. 8, 2008.

(51) Int. Cl.
*H04L 1/00* (2006.01)
*H04J 11/00* (2006.01)

(56) References Cited

U.S. PATENT DOCUMENTS

| | | |
|---|---|---|
| 2004/0203979 A1 | 10/2004 | Attar et al. |
| 2006/0007876 A1 | 1/2006 | Qian et al. |
| 2006/0268883 A1 | 11/2006 | Qian et al. |
| 2007/0091810 A1 | 4/2007 | Kim et al. |
| 2007/0168821 A1 | 7/2007 | Nguyen |
| 2007/0183384 A1 | 8/2007 | Kwak et al. |
| 2007/0211656 A1 | 9/2007 | Kwak et al. |
| 2008/0075060 A1 | 3/2008 | Tiirola et al. |
| 2008/0075184 A1* | 3/2008 | Muharemovic et al. ...... 375/260 |
| 2008/0102880 A1 | 5/2008 | Gholmieh et al. |
| 2008/0287155 A1 | 11/2008 | Xu et al. |
| 2008/0310383 A1 | 12/2008 | Kowalski |
| 2008/0310540 A1 | 12/2008 | Tiirola et al. |
| 2009/0041139 A1 | 2/2009 | Cho et al. |
| 2009/0042558 A1 | 2/2009 | Shen et al. |
| 2010/0046480 A1 | 2/2010 | Kawamura et al. |
| 2010/0067461 A1 | 3/2010 | Kwak et al. |
| 2010/0173641 A1 | 7/2010 | Kim et al. |
| 2011/0317649 A1 | 12/2011 | Papasakellariou et al. |
| 2013/0028242 A1 | 1/2013 | Baker et al. |

FOREIGN PATENT DOCUMENTS

| | | |
|---|---|---|
| EP | 1 531 576 | 2/2005 |
| EP | 2 453 625 | 5/2012 |
| JP | 2005-536102 | 11/2005 |
| JP | 2007-509510 | 4/2007 |
| JP | 2010525722 | 7/2010 |
| JP | 2010528534 | 8/2010 |
| JP | 2010529769 | 8/2010 |
| JP | 2010529773 | 8/2010 |
| JP | 2010529801 | 8/2010 |
| JP | 2010533408 | 10/2010 |
| JP | 5179579 | 4/2013 |
| RU | 2139636 | 10/1999 |
| WO | WO2005122458 | 12/2005 |
| WO | WO2006105005 | 10/2006 |
| WO | WO2008133449 | 11/2008 |
| WO | WO2008153350 | 12/2008 |

OTHER PUBLICATIONS

Nokia Siemens Networks, Nokia, Performance of CQI+ACK/NACK Transmission on PUCCH, RI-074327, 3GPP TSG RAN WG1 Meeting #50bis, Oct. 2, 2007.

Nokia Siemens Networks, Nokia, Performance of CQI+ACK/NACK Transmission on PUCCH, R1-074327, 3GPP TSG RAN WG1 Meeting #49bis, Jun. 20, 2007.

Samsung, "Multiplexing CQI and ACK/NAK Transmission in E-UTRA UL", R1-074097, 3GPP TSG RAN WG1 #50bis, Oct. 8-12, 2007.

Samsung, "Implicit ACK/NAK Multiplexing in PUCCH CQI Sub-Frame Structure", R1-073577, 3GPP TSG RAN WG1 Meeting #50, Aug. 20-24, 2007.

* cited by examiner

APPARATUS AND METHOD FOR TRANSMITTING CHANNEL QUALITY INDICATOR AND ACKNOWLEDGEMENT SIGNALS IN SC-FDMA COMMUNICATION SYSTEMS

PRIORITY

This application is a Continuation of U.S. application Ser. No. 13/760,771, which was filed in the U.S. Patent and Trademark Office (USPTO) on Feb. 6, 2013, and issued as U.S. Pat. No. 8,855,096 on Oct. 7, 2014, which is a Continuation of U.S. application Ser. No. 12/174,098, which was filed in the USPTO on Jul. 16, 2008, and issued as U.S. Pat. No. 8,391,268 on Mar. 5, 2013, and claims priority under 35 U.S.C. §119 to U.S. Provisional Application No. 60/950,002, which was filed in the USPTO on Jul. 16, 2007, to U.S. Provisional Application No. 60/954,171, which was filed in the USPTO on Aug. 6, 2007, and to U.S. Provisional Application No. 61/019,624, which was filed in the USPTO on Jan. 8, 2008, the content of each of which is incorporated herein by reference.

BACKGROUND OF THE INVENTION

1. Field of the Invention

The present invention is directed, in general, to wireless communication systems and, more specifically, to a Single-Carrier Frequency Division Multiple Access (SC-FDMA) communication system and is further considered in the development of the 3$^{rd}$ Generation Partnership Project (3GPP) Evolved Universal Terrestrial Radio Access (E-UTRA) Long Term Evolution (LTE).

2. Description of the Art

In particular, the present invention is directed to the transmission of positive or negative acknowledgement signals (ACKs or NACKs, respectively) and Channel Quality Indicator (CQI) signals over the same transmission time interval in an SC-FDMA communication system.

Several types of signals should be supported for the proper functionality of the communication system. In addition to data signals, which convey the information content of the communication, control signals also need to be transmitted from User Equipments (UEs) to their serving Base Station (BS or Node B) in the UpLink (UL) of the communication system and from the serving Node B to the UEs in the DownLink (DL) of the communication system in order to enable the proper transmission of data signals.

The present invention considers the UL communication and assumes that the transmission of signals carrying the data content information from UEs is through a Physical Uplink Shared CHannel (PUSCH) while, in the absence of data information, the transmission of control signals from the UEs is through the Physical Uplink Control CHannel (PUCCH). A UE, also commonly referred to as a terminal or a mobile station, may be fixed or mobile and may be a wireless device, a cellular phone, a personal computer device, a wireless modem card, etc. A Node B is generally a fixed station and may also be called a Base Transceiver System (BTS), an access point, or some other terminology.

The ACK/NACK is a control signal associated with the application of Hybrid Automatic Repeat reQuest (HARQ) and is in response to the correct or incorrect, respectively, data packet reception in the DL of the communication system (also known as HARQ-ACK). A data packet is retransmitted after the reception of a NACK and a new data packet may be transmitted after the reception of an ACK.

The CQI is another control signal that provides information to the serving Node B about the channel conditions, such as the Signal-to-Interference and Noise Ratio (SINR), experienced in portions of or over the entire DL operating bandwidth. The present invention further considers that the ACK/NACK and CQI transmissions are in the absence of any data transmission from a reference UE.

The UEs are assumed to transmit data or control signals over a Transmission Time Interval (TTI), which in an exemplary embodiment of the present invention corresponds to a sub-frame.

FIG. 1 illustrates a block diagram of a sub-frame structure 110 assumed in an exemplary embodiment of the present invention. The sub-frame includes two slots. A first slot 120 further includes seven symbols used for the transmission of data and/or control signals. Each symbol 130 further includes a Cyclic Prefix (CP) in order to mitigate interference due to channel propagation effects. The signal transmission in one slot may be in the same part or it may be at a different part of the operating bandwidth than the signal transmission in the other slot. In addition to symbols carrying data or control information, some symbols may be used for the transmission of Reference Signals (RS), also known as pilots, used to provide channel estimation and enable coherent demodulation of the received signal. It is also possible for the TTI to include only one slot or more than one sub-frames.

The transmission BandWidth (BW) is assumed to include frequency resource units that will be referred to herein as Resource Blocks (RBs). An exemplary embodiment of the present invention assumes that each RB includes 12 sub-carriers, and that UEs are allocated a multiple N of consecutive RBs 140 for PUSCH transmission and 1 RB for PUCCH transmission. Nevertheless, it should be noted that the above values are only illustrative and should be not restrictive to the described embodiments of the invention.

FIG. 2 illustrates an exemplary structure for a CQI transmission during one slot 210 in a SC-FDMA communication system. The CQI information bits 220, through modulators 230, modulate a Constant Amplitude Zero Auto-Correlation (CAZAC) sequence 240, for example with QPSK or 16QAM modulation, which is then transmitted by the UE, after performing an Inverse Fast Fourier Transform (IFFT) operation as it is further subsequently described. In addition to the CQI, RS is transmitted to enable coherent demodulation at the Node B receiver of the CQI signal. In an exemplary embodiment, the second and sixth SC-FDMA symbols in each slot carry the RS transmission 250.

As mentioned above, the CQI and RS signals are assumed to be constructed from CAZAC sequences. An example of such sequences is given by the following Equation (1):

$$c_k(n) = \exp\left[\frac{j2\pi k}{L}\left(n + n\frac{n+1}{2}\right)\right]. \tag{1}$$

In Equation (1), L is a length of the CAZAC sequence, n is an index of an element of the sequence n={0, 1, 2 ..., L−1}, and k is an index of the sequence itself. For a given length L, there are L−1 distinct sequences, if L is prime. Therefore, an entire family of sequences is defined as k ranges in {1, 2 ..., L−1}. However, it should be noted that the CAZAC sequences used for the CQI and RS generation need not be generated using the exact above expression as will be further discussed below.

For CAZAC sequences of prime length L, the number of sequences is L−1. As the RBs are assumed to include an even number of sub-carriers, with 1 RB including 12 sub-carriers, the sequences used to transmit the ACK/NACK and RS can be generated, in the frequency or time domain, by either truncating a longer prime length (such as length 13) CAZAC sequence or by extending a shorter prime length (such as length 11) CAZAC sequence by repeating its first element(s) at the end (cyclic extension), although the resulting sequences do not fulfill the definition of a CAZAC sequence. Alternatively, the CAZAC sequences can be directly generated through a computer search for sequences satisfying the CAZAC properties.

An exemplary block diagram for a transmission of a CAZAC sequence through SC-FDMA signaling in the time domain is illustrated in FIG. 3. The structure illustrated in FIG. 3 can be used, for example, for the CQI transmission in the PUCCH.

Referring to FIG. 3, the CAZAC sequence 310 is generated through one of the previously described methods (modulated for transmission of CQI bits, un-modulated for RS transmission), and is then cyclically shifted 320 as will be subsequently described. The Discrete Fourier Transform (DFT) of the resulting sequence is then obtained 330, the sub-carriers 340 corresponding to the assigned transmission bandwidth are selected 350, the IFFT is performed 360, and finally the cyclic prefix (CP) 370 and filtering 380 are applied to the transmitted signal. Zero padding is assumed to be inserted by the reference UE in sub-carriers used for the signal transmission by another UE and in guard sub-carriers (not shown).

Moreover, for brevity, additional transmitter circuitry such as digital-to-analog converter, analog filters, amplifiers, and transmitter antennas as they are known in the art, are not illustrated in FIG. 3. Similarly, the encoding process and the modulation process for CQI bits, which are well known in the art, such as block coding and QPSK modulation, are also omitted for brevity.

At the receiver, the inverse (complementary) transmitter functions are performed. This is conceptually illustrated in FIG. 4, in which the reverse operations of those in FIG. 3 apply.

As it is known in the art (although not shown for brevity), an antenna receives the radio-frequency (RF) analog signal and after further processing units (such as filters, amplifiers, frequency down-converters, and analog-to-digital converters) the digital received signal 410 passes through a time windowing unit 420 and the CP is removed 430. Subsequently, the receiver unit applies an FFT 440, selects 450 the sub-carriers 460 used by the transmitter, applies an Inverse DFT (IDFT) 470, de-multiplexes (in time) the RS and CQI signal 480, and after obtaining a channel estimate based on the RS (not shown), extracts the CQI bits 490.

As for the transmitter, well known in the art receiver functionalities such as channel estimation, demodulation, and decoding are not shown for brevity and they are not material to the invention.

An alternative generation method for the transmitted CAZAC sequence is in the frequency domain, which is illustrated in FIG. 5.

Referring to FIG. 5, the generation of the transmitted CAZAC sequence in the frequency domain follows the same steps as in the time domain with two exceptions. The frequency domain version of the CAZAC sequence is used 510 (that is, the DFT of the CAZAC sequence is pre-computed and not included in the transmission chain) and the cyclic shift 550 is applied after the IFFT 540. The selection 520 of the sub-carriers 530 corresponding to the assigned transmission bandwidth, and the application of cyclic prefix (CP) 560 and filtering 570 to the transmitted signal 580, as well as other conventional functionalities (not shown), are the same as previously described for FIG. 3.

The reverse functions are again performed for the reception of the CAZAC-based sequence transmitted as described in FIG. 5. As is illustrated in FIG. 6, the received signal 610 passes through a time windowing unit 620 and the CP is removed 630. Subsequently, the cyclic shift is restored 640, an FFT 650 is applied, and the transmitted sub-carriers 660 are selected 665. FIG. 6 also illustrates the subsequent correlation 670 with the replica 680 of the CAZAC-based sequence. Finally, the output 690 is obtained, which can then be passed to a channel estimation unit, such as a time-frequency interpolator, in case of a RS, or can be used for detecting the transmitted information, in case the CAZAC-based sequence is modulated by the CQI information bits.

As described above, if the transmitted CAZAC-based sequence illustrated in FIG. 3 or FIG. 5 is not be modulated by any information (data or control), it can then serve as the RS. For CQI transmission, the CAZAC-based sequence is obviously modulated by the CQI information bits (for example, using QPSK modulation). FIG. 3 and FIG. 5 are then modified in a straightforward manner to include the real or complex multiplication of the generated CAZAC sequence with the CQI information symbols. FIG. 2 illustrates such a modulation of a CAZAC sequence.

Different cyclic shifts of the same CAZAC sequence provide orthogonal CAZAC sequences. Therefore, different cyclic shifts of the same CAZAC sequence can be allocated to different UEs in the same RB for their RS or CQI transmission, and achieve orthogonal UE multiplexing. This principle is illustrated in FIG. 7.

Referring to FIG. 7, in order for the multiple CAZAC sequences 710, 730, 750, and 770 generated correspondingly from multiple cyclic shifts 720, 740, 760, and 780 of the same root CAZAC sequence to be orthogonal, the cyclic shift value δ 790 should exceed the channel propagation delay spread D (including a time uncertainty error and filter spillover effects). If $T_S$ is the duration of one symbol, the number of cyclic shifts is equal to the mathematical floor of the ratio $T_S/D$. For 12 cyclic shifts and for symbol duration of about 66 microseconds (14 symbols in a 1 millisecond sub-frame), the time separation of consecutive cyclic shifts is about 5.5 microseconds. Alternatively, to provide better protection against multipath propagation, only 6 cyclic shifts may be used providing time separation of about 11 microseconds.

The first exemplary setup of the present invention assumes that the UL slot structure for CQI transmission comprises of 5 CQI and 2 RS symbols in 1 RB in each of the 2 slots of the sub-frame (the structure in one slot is illustrated in FIG. 2, the same or a similar structure is repeated for the second slot). During the first slot of the sub-frame the transmission is towards one end of the operating bandwidth and during the second slot it is typically towards the other end of the operating bandwidth (not necessarily the first or last RB of the operating bandwidth, respectively). Nevertheless, transmission may be only in one slot.

Occasionally, it is likely that a UE needs to transmit an ACK/NACK signal, in response to a previously received data packet in the DL of the communication system during the same sub-frame the UE has its CQI transmission in the PUCCH (i.e., the UE has no information data to transmit in the PUSCH). To accomplish this transmission without affecting the multiplexing capacity of ACK/NACK and CQI signals, the prior art considers that the UE suspends the CQI transmission in one or more symbols in order to transmit the ACK/NACK information. This is illustrated in FIG. 8.

Comparing to an equivalent structure of FIG. 2 which does not have any ACK/NACK transmission in the slot 810, one SC-FDMA symbol used for CQI transmission is being replaced by an ACK/NACK transmission 820 leading to a reduction in the number of CQI transmission symbols 830, 835 while the number of RS transmission symbols 840 remains unchanged. Similarly to the CQI bits, the ACK/NACK bits modulate 850 a CAZAC-based sequence 860. The same concept may apply on both slots of a sub-frame if the transmission is over the sub-frame. Therefore, as is the case for the CQI and RS transmission, ACK/NACK is also transmitted by modulating a CAZAC sequence.

When multiplexing ACK/NACK transmission on the same slot or sub-frame as the CQI transmission as illustrated in FIG. 8, a smaller number of CQI information bits should be transmitted in order to avoid decreasing the reliability of the CQI transmission. Alternatively, in order to transmit the same number of CQI information bits a higher code rate should be used, thereby leading to reduced reliability for the received codeword and different coding and decoding processes (depending on whether or not ACK/NACK is also transmitted).

In addition to degrading the CQI reception reliability or reducing the CQI transmission payload, the structure illustrated in FIG. 8 severely limits the ACK/NACK performance as only one symbol per slot is used for ACK/NACK instead of multiple symbols per slot as for example when only ACK/NACK bits (no CQI bits) are transmitted in a slot (except in symbols having RS transmission, if any).

Therefore, puncturing CQI symbols to insert ACK/NACK symbols in the PUCCH is associated with significant performance disadvantages for the transmission of both of these control signals.

Therefore, there is a need to multiplex ACK/NACK information bits in a CQI transmission sub-frame without penalizing the CQI or ACK/NACK performance.

There is another need to multiplex transmission of ACK/NACK information bits in a CQI transmission sub-frame without reducing the number of CQI information bits.

Finally, there is another need to multiplex transmission of ACK/NACK information bits in a CQI transmission sub-frame without substantially changing the transmitter or receiver structure relative to the case of individual transmission for either of these two control signals.

SUMMARY OF THE INVENTION

Accordingly, the present invention has been designed to solve the aforementioned problems occurring in the prior art, and provide at least the advantages described below.

An aspect of the present invention is to provide an apparatus and method for multiplexing the transmission of acknowledgement (ACK/NACK) signals and CQI signals from a User Equipment (UE).

Another aspect of the present invention is for the performance of CQI transmission with ACK/NACK multiplexing to be effectively the same as the performance of CQI transmission without ACK/NACK multiplexing.

Another aspect of the present invention is to use the same number of CQI information bits with ACK/NACK multiplexing as without ACK/NACK multiplexing.

Another aspect of the present invention is to use the ACK/NACK transmission to achieve reliable performance.

Another aspect of the present invention is to use the multiplexing of ACK/NACK and CQI transmissions with substantially the same transmitter and receiver structures.

Another aspect of the present invention is to provide robust system operation for ACK/NACK and CQI multiplexing as the absence of ACK/NACK transmission from a UE when its serving Node B expects such transmission causes only minor operational losses.

In accordance with an aspect of the present invention, a method is provided for transmitting information symbols in a single-carrier frequency division multiple access communication system. The method includes determining a CQI; determining two acknowledgement bits in response to data reception; generating a first symbol based on the CQI; generating a second symbol based on the two acknowledgement bits; and transmitting the first symbol and the second symbol. A first code is applied to the second symbol, if the two acknowledgement bits have a first value, a second code is applied to the second symbol, if the two acknowledgement bits have a second value, a third code is applied to the second symbol, if the two acknowledgement bits have a third value, and a fourth code is applied to the second symbol, if the two acknowledgement bits have a fourth value.

In accordance with another aspect of the present invention, an apparatus is provided for transmitting information symbols in a single-carrier frequency division multiple access communication system. The apparatus includes a controller to determine a CQI and two acknowledgement bits, and to generate a first symbol and a second symbol based on the CQI and the two acknowledgement bits, respectively, the two acknowledgement bits being determined in response to data reception; and a transmitter to transmit the first symbol and the second symbol. A first code is applied to the second symbol, if the two acknowledgement bits have a first value, a second code is applied to the second symbol, if the two acknowledgement bits have a second value, a third code is applied to the second symbol, if the two acknowledgement bits have a third value, and a fourth code is applied to the second symbol, if the two acknowledgement bits have a fourth value.

In accordance with another aspect of the invention, a method is provided for receiving information symbols in a single-carrier frequency division multiple access communication system. The method includes receiving a first symbol and a second symbol; identifying a CQI based on the first symbol; and identifying two acknowledgement bits based on the second symbol. A first code is applied to the second symbol, if the two acknowledgement bits have a first value, a second code is applied to the second symbol, if the two acknowledgement bits have a second value, a third code is applied to the second symbol, if the two acknowledgement bits have a third value, and a fourth code is applied to the second symbols, if the two acknowledgement bits have a fourth value.

In accordance with another aspect of the invention, an apparatus is provided for receiving information symbols in a single-carrier frequency division multiple access communication system. The apparatus includes a receiver to receive a first symbol and a second symbol; and a controller to identify a CQI based on the first symbol, and to identify two acknowledgement bits based on the second symbol. A first code is applied to the second symbol, if the two acknowledgement bits have a first value, a second code is applied to the second symbol, if the two acknowledgement bits have a second value, a third code is applied to the second symbol, if the two acknowledgement bits have a third value, and a fourth code is applied to the second symbol, if the two acknowledgement bits have a fourth value.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Various embodiments of the present invention will now be described more fully hereinafter with reference to the accompanying drawings. The present invention may, however, be embodied in many different forms and should not be construed as limited to the embodiments set forth herein. Rather, these illustrative embodiments are provided so that this disclosure will be thorough and complete and will fully convey the scope of the invention to those skilled in the art.

Additionally, although the present invention is described with reference to a Single-Carrier Frequency Division Multiple Access (SC-FDMA) communication system, it also applies to all FDM systems in general and to Orthogonal FDMA (OFDMA), OFDM, FDMA, Discrete Fourier Transform (DFT)-spread OFDM, DFT-spread OFDMA, Single-Carrier OFDMA (SC-OFDMA), and SC OFDM in particular.

The embodiments of the present invention solve problems related to the need for multiplexing the transmission of acknowledgement (ACK/NACK) signals and Channel Quality Indicator (CQI) signals transmitted by a User Equipment (UE) in the absence of information data signals, for enabling reliable reception for both of these signals, for providing robust system operation as a result of the multiplexing ACK/NACK and CQI signals, and for facilitating the use of substantially the same transmitter and receiver structures with minimal modifications, when multiplexing the previous two signals, with respect to the corresponding structures for support of only CQI signaling.

As described above in the background, the CQI transmission from a UE in a Physical Uplink Control CHannel (PUCCH), which is typically periodic in nature, may occur in the same sub-frame as the ACK/NACK signal transmission to support Hybrid Automatic Repeat reQuest (HARQ) (HARQ-ACK) in response to a prior data reception by the UE in the downlink of the communication system. As the ACK/NACK signal transmission usually cannot be postponed, it is beneficial to multiplex it with the CQI signal transmission. Otherwise, the CQI signal transmission should be dropped, which may cause scheduling inefficiencies in the downlink of the communication system due to the absence of relevant CQI.

The present invention considers embedding the ACK/NACK bits onto the reference signal (RS) transmitted together with the CQI signal in each slot (in different SC-FDMA symbols). This is accomplished by having the UE apply orthogonal covering to the RS depending on the transmitted ACK/NACK bits.

Figure 1:
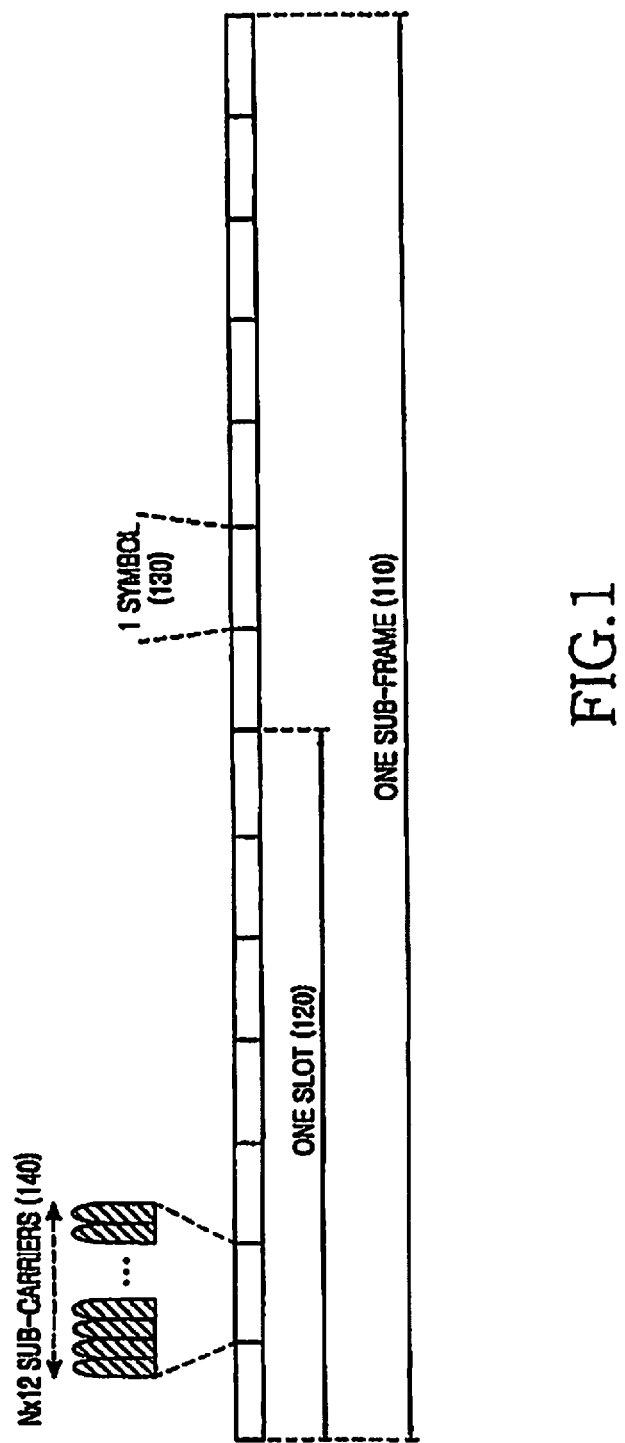
FIG. 1 is a diagram illustrating an exemplary slot structure for an SC-FDMA communication system.
Figure 2:
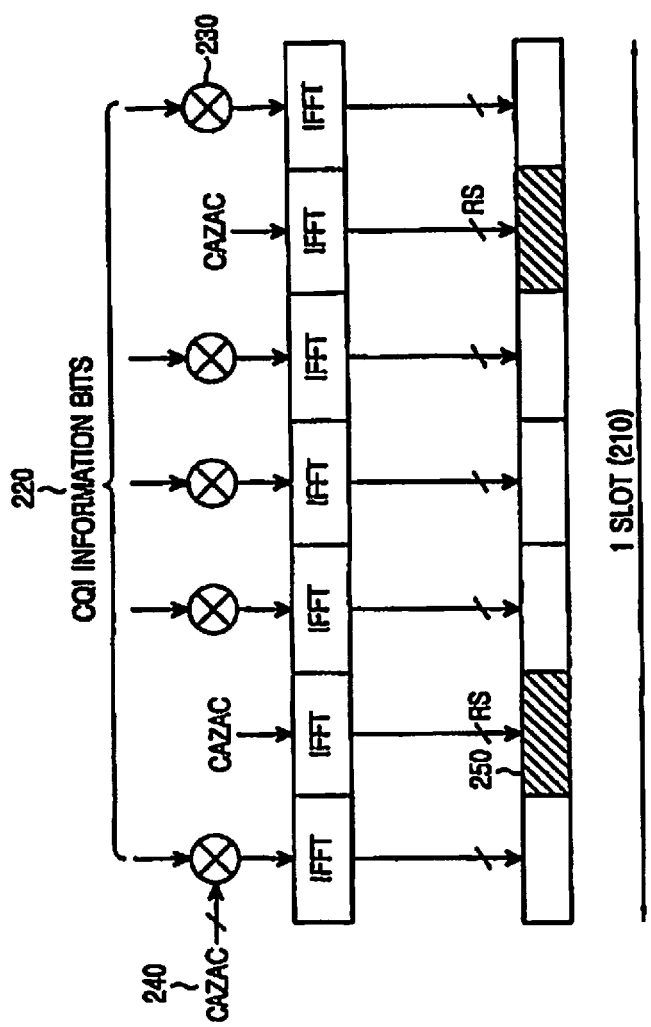
FIG. 2 is a diagram illustrative of an exemplary partitioning of a first slot structure for the transmission of CQI bits.
Figure 3:
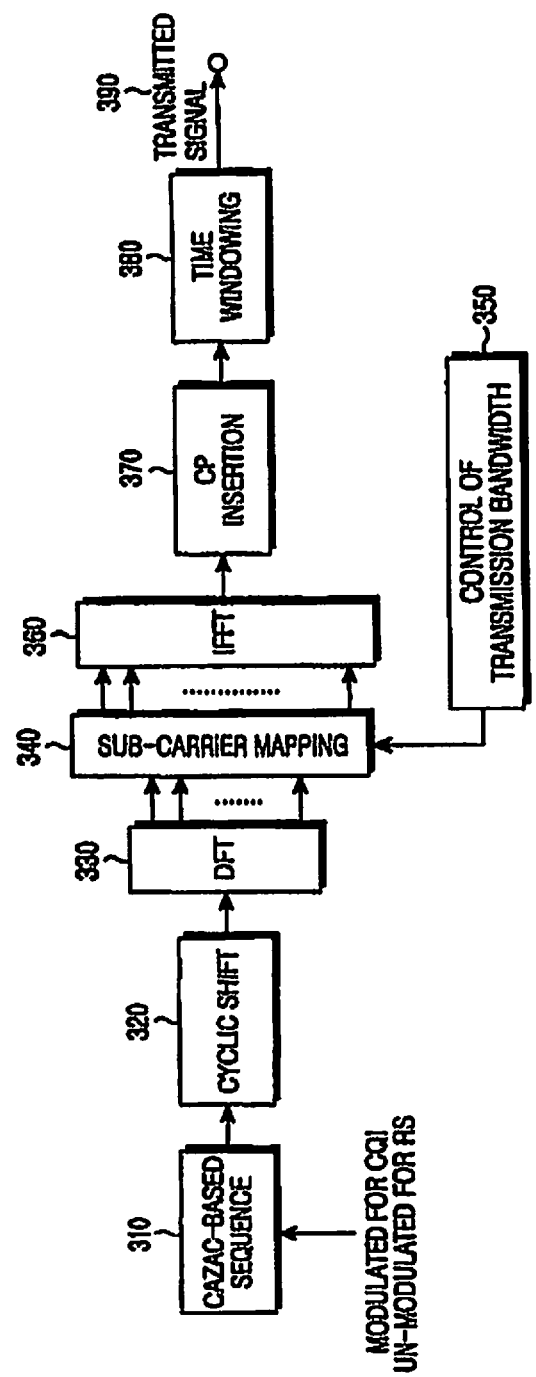
FIG. 3 is a block diagram illustrative of a first exemplary SC-FDMA transmitter for transmitting a CQI signal or a reference signal using a CAZAC-based sequence in the time domain.
Figure 4:
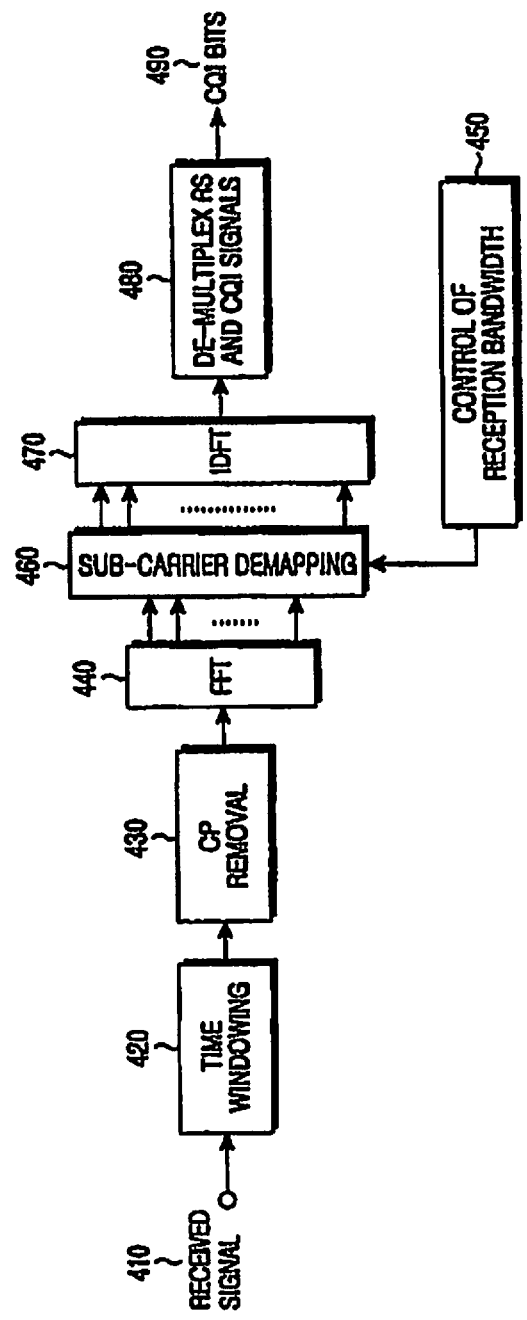
FIG. 4 is a block diagram illustrative of a first exemplary SC-FDMA receiver for receiving a CQI signal or a reference signal using a CAZAC-based sequence in the time domain.
Figure 5:
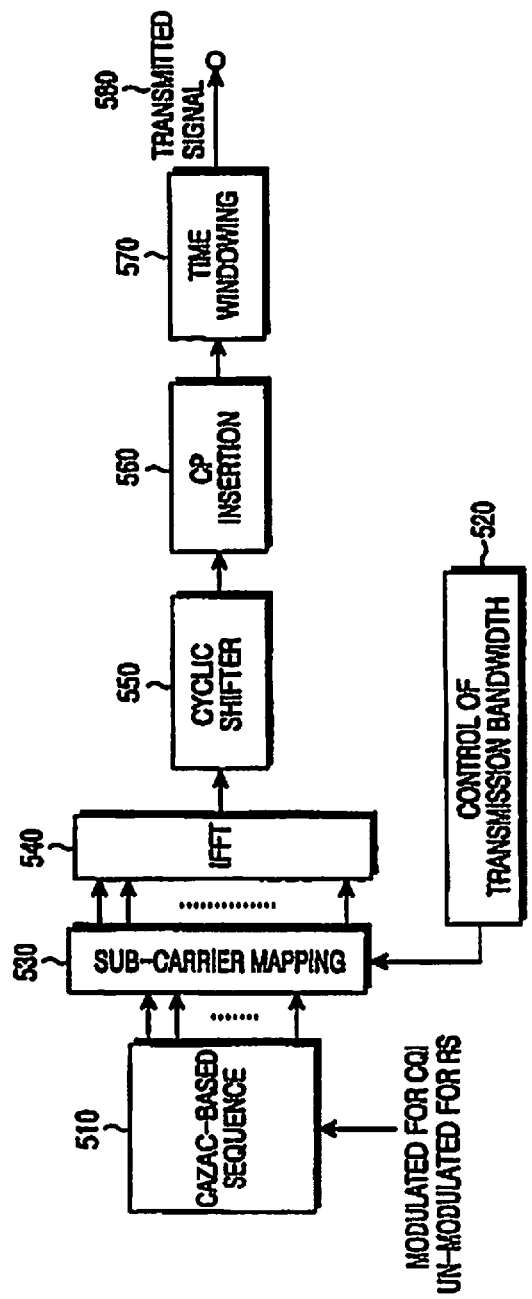
FIG. 5 is a block diagram illustrative of a second exemplary SC-FDMA transmitter for transmitting a CQI signal or a reference signal using a CAZAC-based sequence in the frequency domain.
Figure 6:
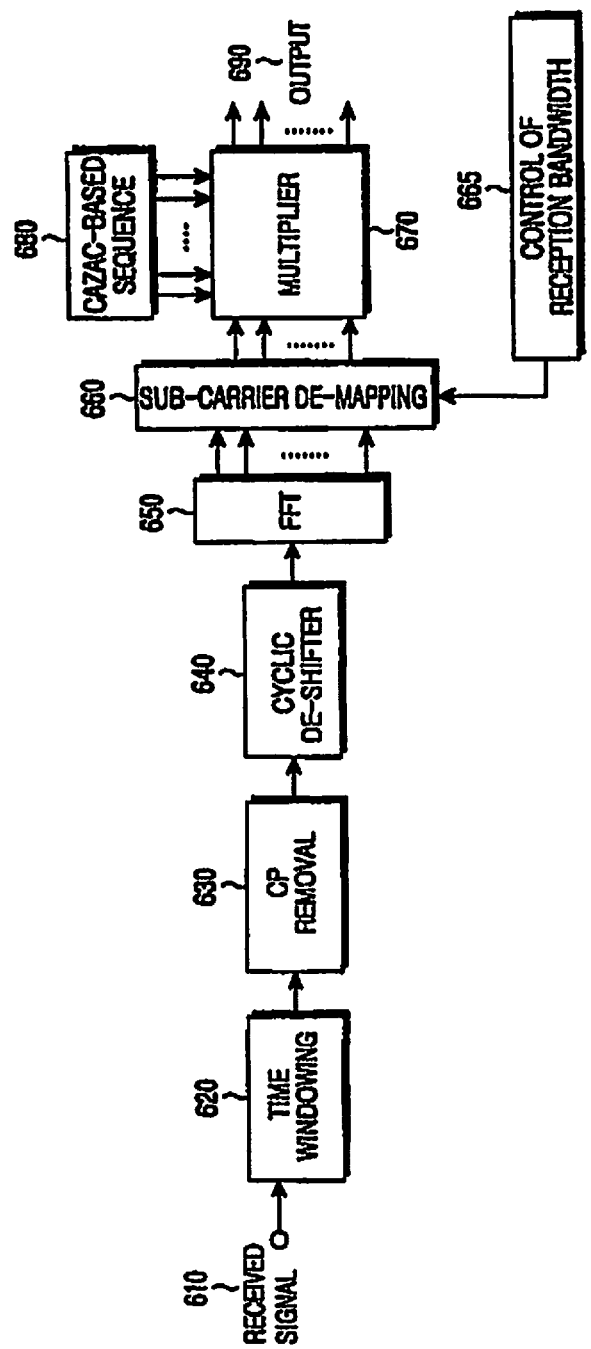
FIG. 6 is a block diagram illustrative of a second exemplary SC-FDMA receiver for receiving a CQI signal or a reference signal using a CAZAC-based sequence in the frequency domain.
Figure 7:
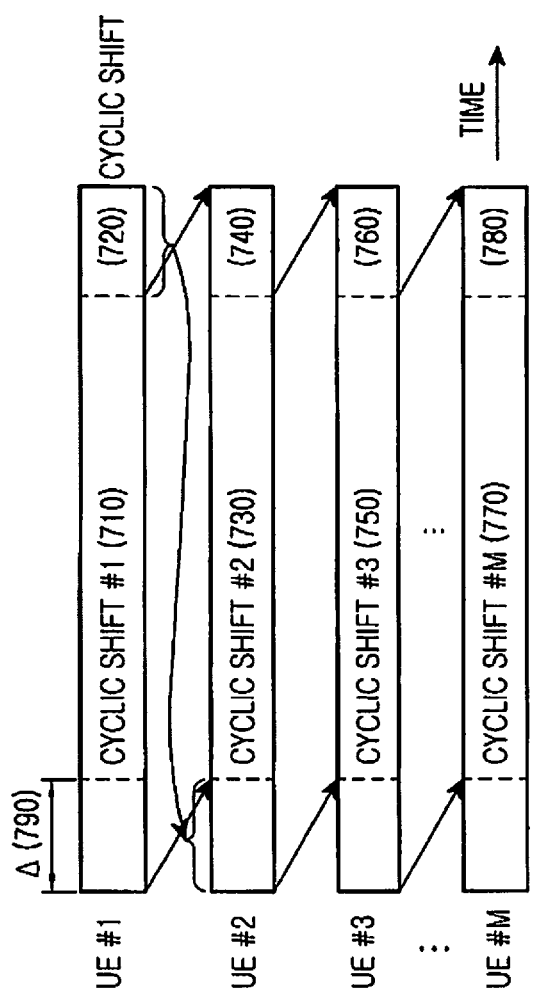
FIG. 7 is a block diagram illustrating an exemplary construction of orthogonal CAZAC-based sequences through the application of different cyclic shifts on a root CAZAC-based sequence.
Figure 8:
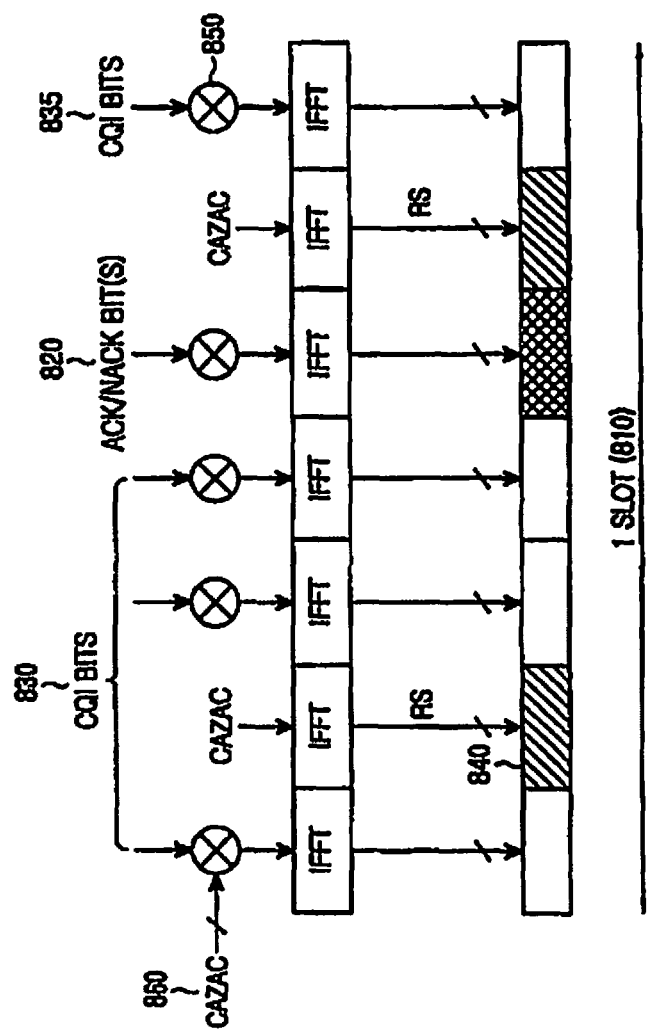
FIG. 8 is a diagram illustrative of a prior art method for multiplexing CQI bits and ACK/NACK bits by puncturing some of the CQI bits and replacing them with ACK/NACK bits.
Figure 9:
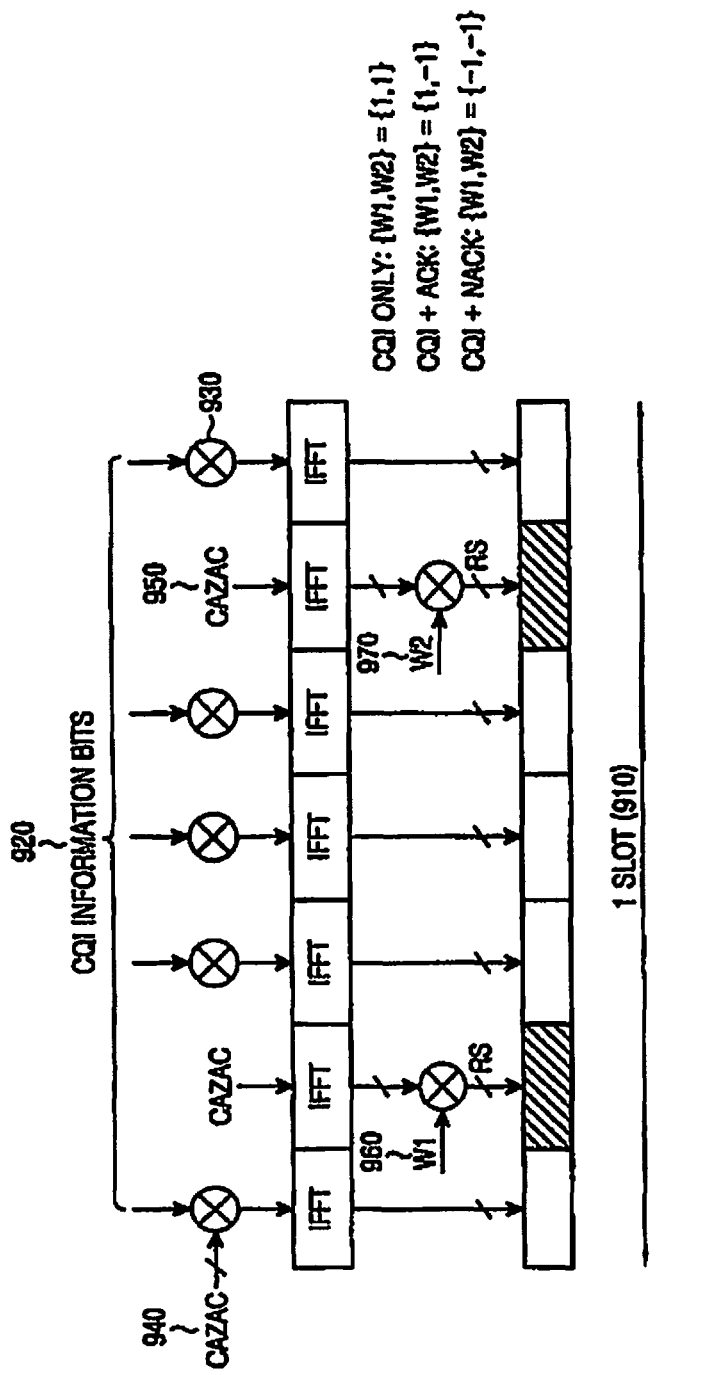
FIG. 9 is a diagram illustrative of implicit multiplexing of ACK/NACK bits in a CQI transmission slot by applying an orthogonal cover to the symbols in the slot that carry the reference signal, wherein the orthogonal cover depends on the value of the ACK/NACK bits.

One exemplary embodiment for applying orthogonal covering to the RS in the CQI slot structure depending on the existence and value of ACK/NACK bits is illustrated in FIG. 9. Compared to FIG. 2, in FIG. 9, the CQI transmission 920 in the slot 910 remains the same and the same multiplexing 930 with a CAZAC-based sequence 940 applies. The RS 950 is also constructed from a (un-modulated) CAZAC-based sequence. The difference originates from the multiplication of each of the two RS with each element, W1 960 and W2 970, of a length-2 orthogonal cover. Different orthogonal covers correspond to positive (ACK) and negative (NACK) acknowledgement signals. Therefore, no explicit ACK/NACK signaling is performed by the UE and the ACK/NACK information is implicitly mapped into the RS.

As the covering applied to the RS in FIG. 9 is orthogonal (such as length-2 Walsh/Hadamard codes), the Node B receiver can simply average the two RSs, after applying each of the possible de-covering operations, when it expects both CQI and ACK/NACK transmission. The result will be only noise for the incorrect covers, while it will be the channel estimate for the correct one.

Subsequently, by performing separate decoding operations and selecting the one maximizing a decision metric, as it is known in the art, the selection for the transmission of either CQI only, or CQI and ACK, or CQI and NACK can be made. Because the incorrect ones have only noise for the corresponding channel estimate (no RS power), the likelihood of selecting the correct hypothesis is not materially affected. Incorrect CQI decoding is still dominated by the hypothesis with the correct setting regarding the ACK/NACK transmission.

Alternatively, the Node B may avoid having to perform separate decoding operations and rely on the accumulated energy after averaging the two RSs, after the de-covering operation. The magnitude of the resulting complex signal after averaging is used to obtain its energy. The correct hypothesis results in larger signal energy than the incorrect ones that contain only noise. After a decision for the RS orthogonal cover that is used at the transmitter is made, based on the largest resulting energy among the possible orthogonal covers as described above, the receiver applies that orthogonal cover to the RS in order to obtain a channel estimate used for coherent demodulation of the CQI signal.

In an exemplary embodiment of the present invention, based on the accumulated energy, which is obtained by averaging the two RSs in each slot for each of the possible orthogonal covers, a decision on the ACK/NACK value can be made. The accuracy of this decision is typically much better than the usual reception reliability requirements for the CQI. Therefore, the CQI performance remains unaffected by the ACK/NACK multiplexing and the desired accuracy for the ACK/NACK decision is also achieved.

In practice, the multiplication with W1 and W2 in FIG. 9 is not necessary. Either the resulting signal, after the IFFT, is transmitted as the RS (multiplication by 1) or it has its sign inverted (multiplication with −1). For high UE speeds, where RS averaging (RS addition or RS subtraction) is not as reliable due to the higher channel variation, the performance of the above decoding method is somewhat affected as for the incorrect hypotheses the result of RS averaging will still be noise but with a higher variance compared to the case of low UE speeds where the channel variations are smaller and the RS value, excluding noise, remains largely unchanged in the two corresponding symbols in each slot.

Complex scaling coefficients for the RS can also be used to increase the number of possible combinations of CQI and ACK/NACK bits that can be detected. For example, this can be applicable for the case of two ACK/NACK bits and two RS symbols per slot and effectively QPSK modulation may apply on the RS depending on the value of the two ACK/NACK bits.

In addition to the general principle of multiplexing ACK/NACK information into the CQI transmission structure by applying an orthogonal cover on each of the two RSs in a slot of the exemplary embodiment, the present invention further considers the overall system robustness to ACK/NACK errors.

In particular, the present invention considers the error case where the UE has missed a downlink scheduling assignment and therefore it is not aware that it needs to multiplex ACK/NACK in its CQI transmission, when the two happen to coincide in the same transmission time interval, while the serving Node B expects that ACK/NACK is multiplexed. The absence of ACK/NACK transmission from a UE, due to missing the corresponding downlink scheduling assignment, is herein referred to as Discontinuous Transmission (DTX) (of ACK/NACK).

The main objective is for the Node B to avoid interpreting DTX as an ACK because this will cause erroneous operation at the physical layer as the Node B will assume that the UE received the data packet and will not re-transmit it. Instead, additional packet transmissions may follow before this error is realized by the higher layers of the communication system, thereby wasting radio resources and increasing latency for the communication session.

DTX interpretation as a NACK does not cause any serious operation performance issues because the Node B may always choose to interpret DTX as NACK and retransmit the packet, possibly with a different redundancy version of the HARQ process, as it is known in the art, or interpret the NACK as the DTX and simply retransmit the packet with the same redundancy version. Assuming turbo coding is used, the former approach may be used for low or medium coding rates of the data packet, where systematic bits are present in the packet retransmission, while the latter approach may be used for high coding rates to ensure the presence of systematic bits in retransmissions. In either case, the performance degradation of the packet reception, if any, is limited and does not have a meaningful impact on the communication session or the system throughput.

The positive tradeoff is that the Node B needs to only perform a 2-state detection (ACK or NACK) instead of a 3-state one (ACK, NACK, or DTX). This aspect of the present invention enhances the ACK/NACK detection reliability and improves the system operation and throughput.

The present invention incorporates the above observations into further refining the selection of the orthogonal cover applied to the associated RS in a slot of CQI transmission in the PUCCH. The rule applied for this selection is such that the DTX and NACK states are collapsed onto the same state, which the Node B may interpret either as a DTX or as a NACK.

Figure 10:
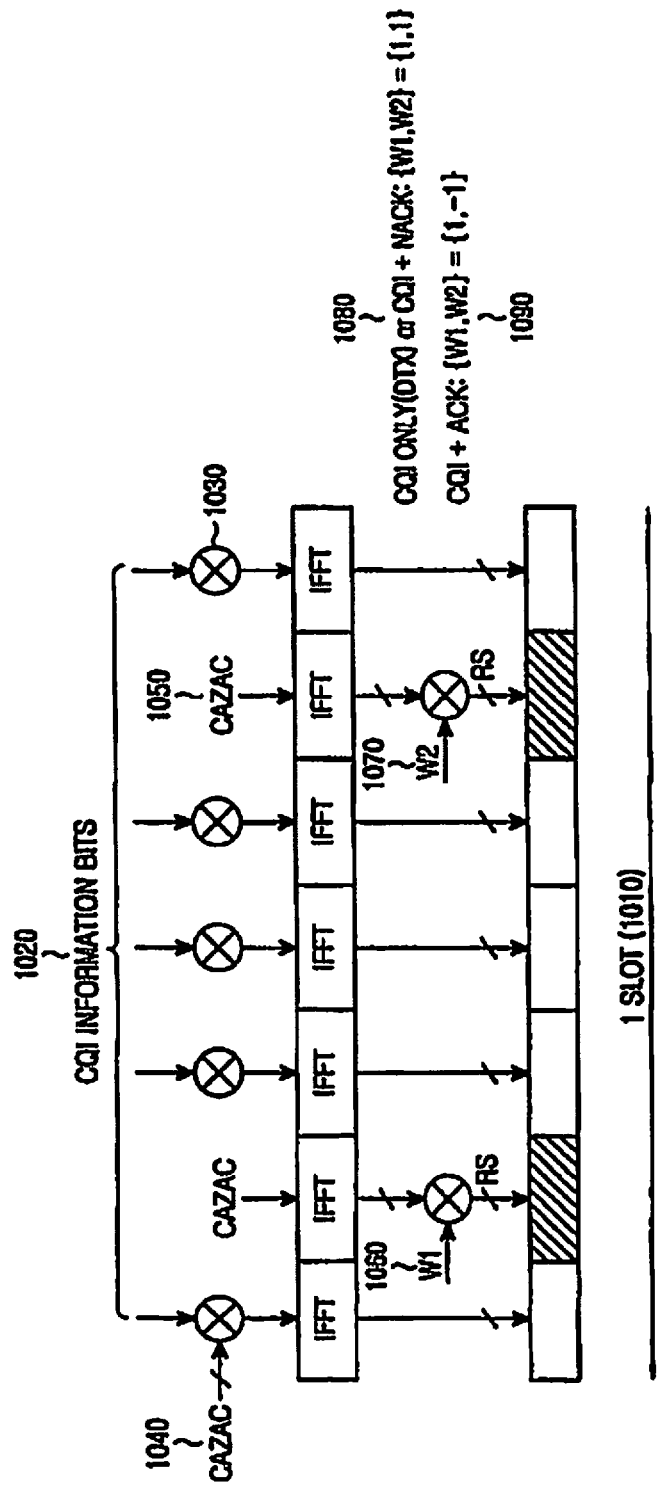
FIG. 10 is a diagram illustrative of implicit multiplexing of ACK/NACK bits in a CQI transmission slot by applying an orthogonal cover to the symbols in the slots that carry the reference signal, wherein the orthogonal cover depends on the value of the ACK/NACK bits and the same orthogonal cover is used when NACK is multiplexed and when no ACK/NACK bits exist.

An exemplary embodiment considers the case of 1-bit ACK/NACK transmission and is illustrated in FIG. 10. In FIG. 10, the only difference relative to FIG. 9 is the specific orthogonal cover applied to the ACK and NACK.

Referring to FIG. 10, as DTX and NACK are collapsed onto the same state 1080, they correspond to the same code. As the exemplary embodiment assumes that no orthogonal cover applies to the RS when only CQI (without ACK/NACK multiplexing) is transmitted, the orthogonal cover used to indicate DTX and NACK is $\{1, 1\}$. Conversely, ACK is embedded by applying the $\{1, -1\}$ orthogonal cover 1090 to the RS symbols in the CQI transmission slot.

When ACK/NACK information is expected to be included with the CQI transmission in the PUCCH, the Node B receiver can simply remove the binary covering for each of the two hypotheses in FIG. 10 and obtain two corresponding channel estimates. No additional operation is necessary for the hypothesis corresponding to the orthogonal cover of $\{1, 1\}$ (DTX or NACK), while for the hypothesis corresponding to the orthogonal cover of $\{1, -1\}$ (ACK), the signal received during the SC-FDMA symbol corresponding to the second RS is reversed (multiplication with "−1"). Therefore, the process for removing the orthogonal cover at the Node B receiver is the same as the one for applying it at the UE transmitter (FIG. 10).

While the present invention has been shown and described with reference to certain exemplary embodiments thereof, it will be understood by those skilled in the art that various changes in form and details may be made therein without departing from the spirit and scope of the present invention as defined by the appended claims.

What is claimed is:

1. A method for transmitting information symbols in a single-carrier frequency division multiple access communication system, the method comprising:
    determining a channel quality indicator (CQI);
    determining two acknowledgement bits in response to data reception, the two acknowledgement bits representing two acknowledgements;
    generating a first symbol based on the CQI;
    generating a second symbol based on the two acknowledgement bits; and
    transmitting the first symbol and the second symbol in a slot,
    wherein a first code is applied to the second symbol, if the two acknowledgement bits have a first value, a second code is applied to the second symbol, if the two acknowledgement bits have a second value, a third code is applied to the second symbol, if the two acknowledgement bits have a third value, and a fourth code is applied to the second symbol, if the two acknowledgement bits have a fourth value.

2. The method of claim 1, wherein the second symbol is based on the two acknowledgement bits and a reference signal.

3. The method of claim 1, wherein at least one of the first code, the second code, the third code, and the fourth code includes a complex number.

4. The method of claims 1, wherein the first code, the second code, the third code, and the fourth code are 1, −1, j, and −j, respectively, and the j is an imaginary unit.

5. An apparatus for transmitting information symbols in a single-carrier frequency division multiple access communication system, the apparatus comprising:
- a controller to determine a channel quality indicator (CQI) and two acknowledgement bits, and to generate a first symbol and a second symbol based on the CQI and the two acknowledgement bits, respectively, the two acknowledgement bits being determined in response to data reception and representing two acknowledgements; and
- a transmitter to transmit the first symbol and the second symbol in a slot,
- wherein a first code is applied to the second symbol, if the two acknowledgement bits have a first value, a second code is applied to the second symbol, if the two acknowledgement bits have a second value, a third code is applied to the second symbol, if the two acknowledgement bits have a third value, and a fourth code is applied to the second symbol, if the two acknowledgement bits have a fourth value.

6. The apparatus of claim 5, wherein the controller generates the second symbol based on the two acknowledgement bits and a reference signal.

7. The apparatus of claim 5, wherein at least one of the first code, the second code, the third code, and the fourth code include a complex number.

8. The apparatus of claims 5, wherein the first code, the second code, the third code, and the fourth code are 1, −1, j, and −j, respectively, and the j is an imaginary unit.

9. A method for receiving information symbols in a single-carrier frequency division multiple access communication system, the method comprising:
- receiving a first symbol and a second symbol in a slot;
- identifying a channel quality indicator (CQI) based on the first symbol; and
- identifying two acknowledgement bits based on the second symbol, the two acknowledgement bits representing two acknowledgements,
- wherein a first code is applied to the second symbol, if the two acknowledgement bits have a first value, a second code is applied to the second symbol, if the two acknowledgement bits have a second value, a third code is applied to the second symbol, if the two acknowledgement bits have a third value, and a fourth code is applied to the second symbols, if the two acknowledgement bits have a fourth value.

10. The method of claim 9, further comprising identifying a reference signal from the second symbol.

11. The method of claim 9, wherein at least one of the first code, the second code, the third code, and the fourth code includes a complex number.

12. The method of claims 9, wherein the first code, the second code, the third code, and the fourth code are 1, −1, j, and −j, respectively, and the j is an imaginary unit.

13. An apparatus for receiving information symbols in a single-carrier frequency division multiple access communication system, the apparatus comprising:
- a receiver to receive a first symbol and a second symbol in a slot; and
- a controller to identify a channel quality indicator (CQI) based on the first symbol, and to identify two acknowledgement bits based on the second symbol, the two acknowledgement bits representing two acknowledgements,
- wherein a first code is applied to the second symbol, if the two acknowledgement bits have a first value, a second code is applied to the second symbol, if the two acknowledgement bits have a second value, a third code is applied to the second symbol, if the two acknowledgement bits have a third value, and a fourth code is applied to the second symbol, if the two acknowledgement bits have a fourth value.

14. The apparatus of claim 13, wherein the controller identifies a reference signal from the second symbol.

15. The apparatus of claim 13, wherein at least one of the first code, the second code, the third code, and the fourth code includes a complex number.

16. The apparatus of claims 13, wherein the first code, the second code, the third code, and the fourth code are 1, −1, j, and −j, respectively, and the j is an imaginary unit.

* * * * *